No. 854,532. PATENTED MAY 21, 1907.
W. RUNGE.
CARRIAGE FEED MECHANISM FOR LATHES.
APPLICATION FILED AUG. 21, 1906.
2 SHEETS—SHEET 1.
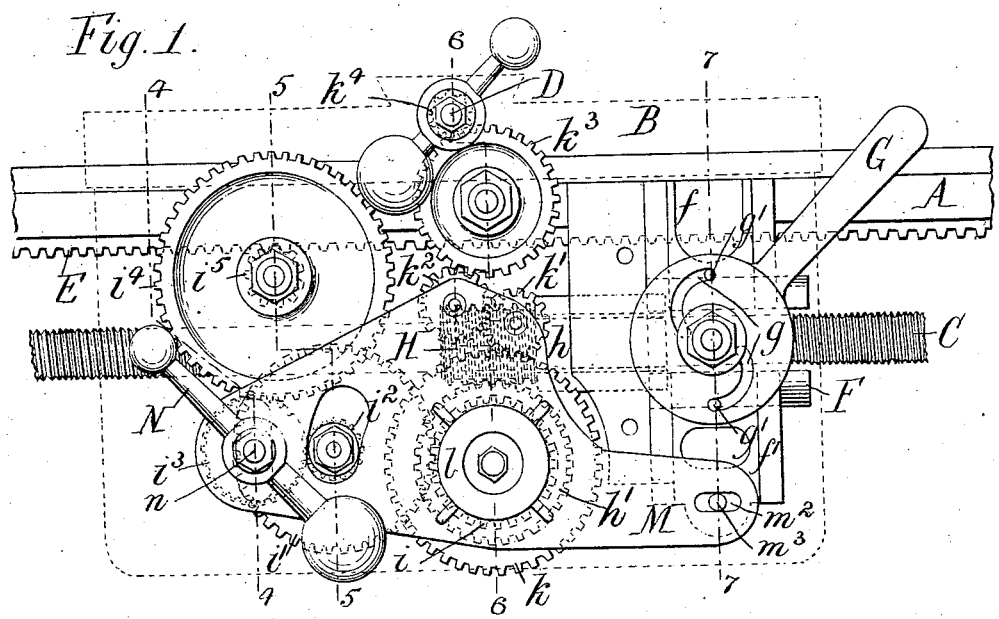
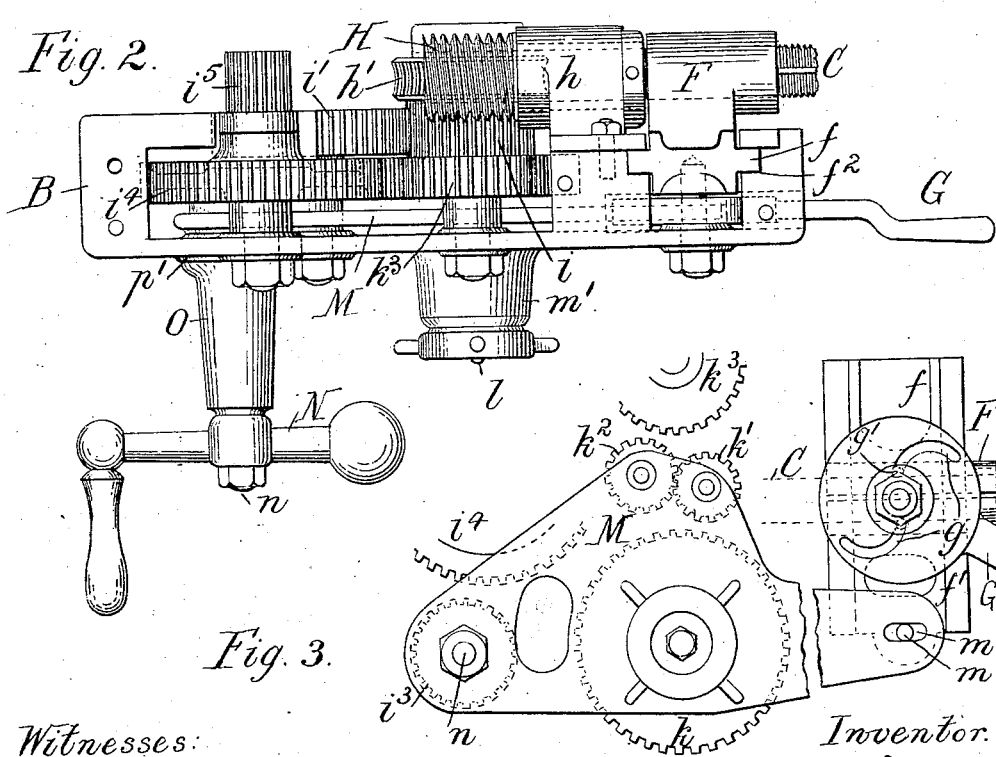
Witnesses:
A. G. Dimond.
E. A. Vock.
Inventor.
William Runge
By Wilhelm, Parker & Hard.
Attorneys.

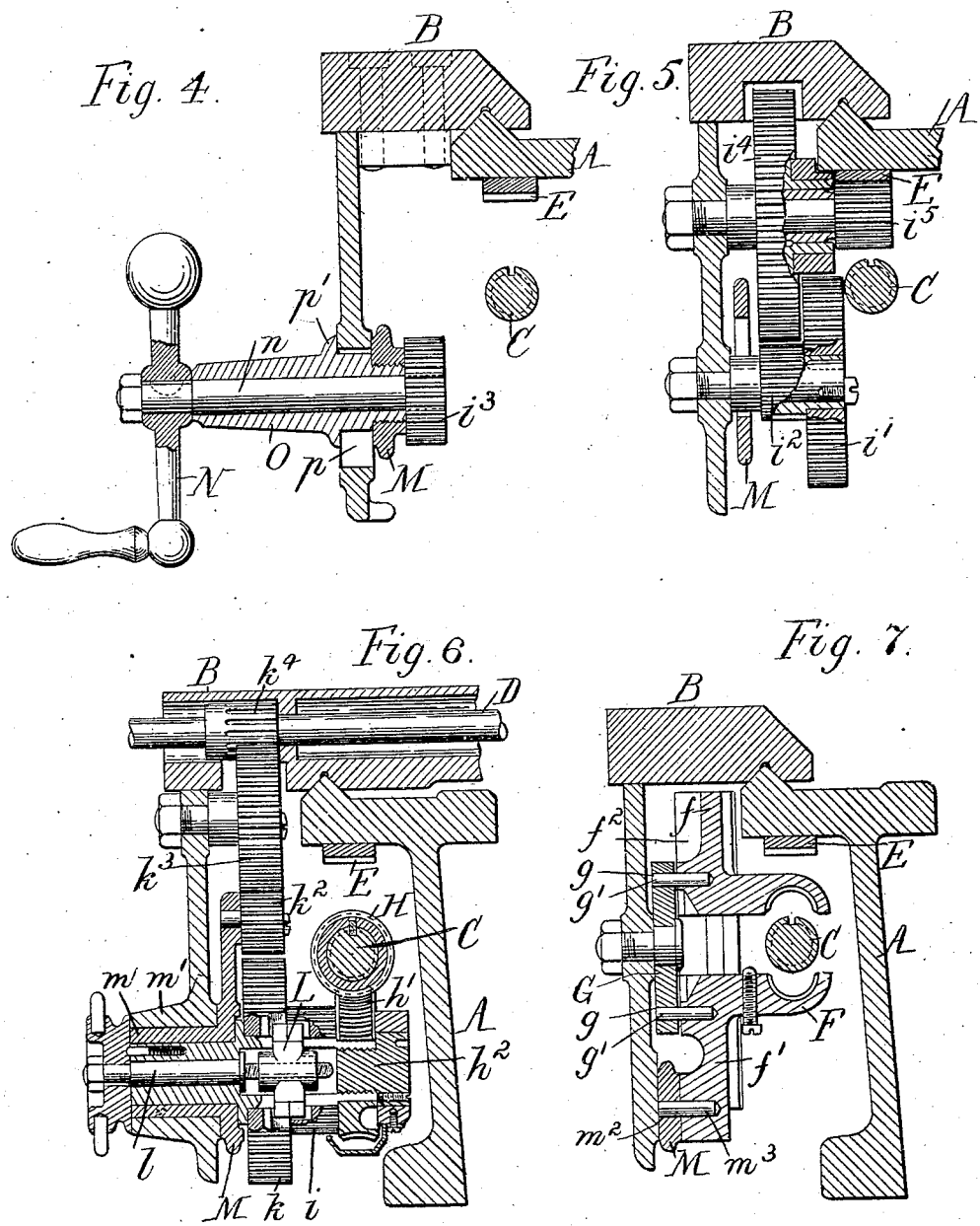

UNITED STATES PATENT OFFICE.

WILLIAM RUNGE, OF SENECA FALLS, NEW YORK, ASSIGNOR TO THE SENECA FALLS MANUFACTURING COMPANY, OF SENECA FALLS, NEW YORK.

CARRIAGE-FEED MECHANISM FOR LATHES.

No. 854,532.

Specification of Letters Patent.

Patented May 21, 1907.

Application filed August 21, 1906. Serial No. 331,545.

*To all whom it may concern:*

Be it known that I, WILLIAM RUNGE, a citizen of the United States, residing at Seneca Falls, in the county of Seneca and State of New York, have invented a new and useful Improvement in Carriage-Feed Mechanisms for Lathes, of which the following is a specification.

This invention relates to feed mechanisms for the tool carriages of lathes and the like.

The ordinary screw-cutting lathe is provided with a power-driven feed shaft or lead screw, and the carriage is moved longitudinally along the bed for feeding the tool lengthwise of the work, either by the direct connection of a feed device or screw nut on the carriage with the feed shaft or screw, or by gearing connecting the carriage with a toothed rack on the lathe bed and operated by hand or by power, and the cross slide is also operated to feed the tool crosswise of the work by gearing operated by hand or by power, depending upon the movement of the tool required for the work being performed. When either the cross or longitudinal power-driven gear feed is used the screw feed must be thrown out of action, and vice versa when the screw feed is used the cross and longitudinal power-driven gear feeds must be thrown out of action to prevent injury to the lathe or work.

One of the primary objects of this invention is to provide lathes with reliable means of simple construction whereby neither the longitudinal nor cross gear feed can be power-operated when the other or screw feed is in operation, but which enables either gear feed to be employed when said other or screw feed has been thrown out of action.

Another object of the invention is to construct the feed mechanism so that the hand crank or device for feeding the carriage longitudinally will not be rotated while the carriage is being operated by the screw feed.

In the accompanying drawings, consisting of two sheets: Figure 1 is a front elevation of a carriage feed mechanism embodying the invention, the carriage apron being omitted and indicated by broken lines, to expose the parts in rear thereof. Fig. 2 is a plan view of the feed mechanism and a portion of the carriage, the top of the carriage being omitted to expose the underlying parts. Fig. 3 is a fragmentary front elevation of the feed mechanism, showing a different position of the parts thereof from that shown in Fig. 1. Figs. 4, 5, 6 and 7 are fragmentary transverse sectional elevations of the carriage and feed mechanism, in lines 4—4, 5—5, 6—6 and 7—7, respectively, Fig. 1.

Like letters of reference refer to like parts in the several figures.

A, B, C, D, E represent, respectively, portions of the bed, tool carriage, power-driven feed shaft or lead screw, cross feed screw-shaft, and toothed rack of the longitudinal gear feed of a screw cutting lathe. These parts may be of any usual or suitable construction and arrangement.

F represents the screw-threaded nut or feed device on the carriage for engagement with the feed shaft or screw to feed the carriage longitudinally. In the construction shown, this nut is of the ordinary construction consisting of two threaded halves or sections carried by slides $ff'$, see Figs. 2 and 7, which are confined in ways $f^2$ on the carriage and are moved toward and from each other by a cam lever G having cam slots $g$ into which extend pins $g'$ on the slides. By swinging the lever in one direction the nut sections are closed about the feed shaft or screw so that the carriage is fed longitudinally by the threaded engagement of the nut with the screw, while by swinging the lever in the opposite direction the nut sections are opened or disengaged from the screw so that the carriage will remain stationary. The described construction of the screw-feed device and its operating means is old and this or any other suitable construction can be employed.

The gearing shown for feeding the carriage longitudinally and the cross slide transversely is as follows: H, Fig. 2, represents the usual worm which is journaled and held from endwise movement on the carriage in a bearing $h$ thereon, and loosely surrounds the feed shaft, being splined thereto, so that the worm will be turned by the shaft but can move longitudinally thereon in the travel of the carriage. The worm drives a worm wheel $h'$ secured to a shaft $h^2$, and this worm wheel is adapted to be connected either to a longitudinal feed train of gear wheels $i$ $i'$ $i^2$ $i^3$ $i^4$ $i^5$, mounted on the carriage, the last of which gear wheels $i^5$ meshes with the toothed rack E on the bed, or to a cross feed train of gear wheels $k\ k'\ k^2\ k^3\ k^4$, the last of which wheels is secured to the cross feed screw D. The gear wheels $i$ and $k$ of the longitudinal and cross feed trains are normally loose on the worm wheel shaft $h^2$, so that neither train will be operated by the rotating worm and worm wheel, and a suitable clutch L, operated by a spindle $l$, see Fig. 6, is provided for connecting these wheels separately, as desired, to the worm wheel shaft. This clutch is fully described in U. S. Letters Patent No. 766,529, issued August 2, 1904, to myself as assignor to The Seneca Falls Manufacturing Company, and it is sufficient for the purposes of this application to state that the clutch can be operated to connect the wheel $i$ of the longitudinal feed gear train, or the wheel $k$ of the cross feed gear train to the worm wheel shaft $h^2$ accordingly, as it is desired to feed the carriage lengthwise or the cross slide crosswise with respect to the work. Any other suitable clutch or means could be used for connecting the feed trains separately to the feed shaft. Except as hereinafter described, the gear trains for the longitudinal and cross feeds are of well known construction and arrangement and any other suitable gear trains could be employed in place of those illustrated. M represents a part, plate or gear carrier which supports one or more of the gear wheels of each feed train and is movably mounted on the carriage and connected to the screw feed nut or device, or its operating means, so as to move the gears carried thereby out of operative relation to the other gears of their respective trains when the feed device is engaged with the feed shaft, and to restore said gears to operative relation to their respective trains when the feed device is disengaged from the feed shaft. Preferably the gear carrier or part is pivoted to the carriage concentrically with the worm wheel shaft $h^2$ by a hollow post or trunnion $m$ loosely surrounding said worm wheel shaft in a bearing boss $m'$ on the carriage apron, see Fig. 6, and one end of the gear carrier has a slot $m^2$ into which extends a pin $m^3$, Figs. 1, 3 and 7, on the slide for the lower section of the feed nut. The gear wheels $i^3$ of the longitudinal feed train and $k'\ k^2$ of the cross feed train are journaled on shafts mounted on the gear carrier and located as shown in the drawings, so that when the feed device F is open or disengaged from the feed shaft these gears will mesh with the adjacent gears of their respective trains, as shown in Fig. 1, whereas when the feed device or nut F is closed on or engaged with the feed shaft the gear wheel $i^3$ of the longitudinal feed train will be moved out of mesh with its companion gear wheel $i^4$ and the gear wheels $k'\ k^2$ of the cross feed train will likewise be moved out of mesh with their companion gear wheels $k\ k^3$, as shown in Fig. 3.

The gear carrier is shown to be connected directly to one of the feed nut sections, but the invention is not limited to this construction, the idea being simply to operate the gear carrier to shift the gears carried thereby when the feed device is operated, whether the gear carrier is connected to the feed device or its operating means, and irrespective of the particular operative connections between the parts.

The two movable gear wheels $k'\ k^2$ are employed in the cross feed train instead of a single wheel as thereby the cross feed screw is turned in the customary direction in the operation of the cross-slide. A single movable wheel could be used, but with a reverse operation of the cross feed screw.

The usual crank or handle N for feeding the carriage lengthwise by hand is preferably secured to the shaft $n$ of the shiftable gear wheel $i^3$ of the longitudinal feed train, as thereby the hand crank will be thrown out of gear with the toothed rack E with said shiftable gear wheel and will not therefore be revolved so as to strike the mechanic or catch in and tear his clothing when the carriage is fed longitudinally by the feed shaft and device. Thus a source of considerable annoyance in lathes is obviated. The shaft $n$ of the hand crank passes through and is supported by a hollow post O, Figs. 2 and 4, secured to the gear carrier and projecting forwardly therefrom through a hole $p$ in the carriage apron. This post has a flange or collar $p'$ which bears against the front face of the apron and serves to steady and guide the gear carrier.

I claim as my invention:

1. In a lathe or the like, the combination of a tool carriage, a driven feed shaft, a feed device for operatively connecting the carriage with said shaft to feed the tool, feed gear trains for producing different movements of the tool, a movable part connected to be operated with said feed device, one or more gears of each of said gear trains being shifted by said movable part into and out of operative position whereby both of said gear trains are together made operative or inoperative, and means for placing one of said gear trains into and out of action independently of the other, substantially as set forth.

2. In a lathe or the like, the combination of a tool carriage, a driven feed shaft, a feed device for operatively connecting the carriage with said shaft to feed the tool, longitudinal and cross feed gear trains for the tool, a movable part connected to be operated with said feed device, one or more gears of each of said gear trains being shifted by said movable part into and out of operative position whereby both of said gear trains are together made operative or inoperative, and means for connecting one of said gear trains independently of the other to said feed shaft, substantially as set forth.

3. In a lathe or the like, the combination of a tool carriage, a driven feed shaft, a feed device for operatively connecting the carriage with said shaft to feed the tool, feed gear trains for producing different movements of the tool, a movable part operated by said feed device, one or more gears of each of said gear trains being shifted by said movable part into and out of operative position whereby both of said gear trains are together made operative or inoperative, a drive member common to both of said gear trains and driven by said feed shaft, and a clutch for connecting either of said gear trains independently of the other to said common drive member, substantially as set forth.

4. In a lathe or the like, the combination of a tool carriage, a driven feed shaft, a feed device for operatively connecting the carriage with said feed shaft to feed the tool, a gear train for feeding the carriage, a movable part connected to be operated with said feed device, a gear wheel of said gear train being shifted by said movable part into and out of operative position, a hand-operating device for said gear train, and means whereby said hand-operating device is rendered inactive by the movement of said movable part, substantially as set forth.

5. In a lathe or the like, the combination of a tool carriage, a driven feed shaft, a feed device for operatively connecting the carriage with said feed shaft to feed the tool, a gear train for feeding the carriage longitudinally, a movable part operated by said feed device, a gear wheel of said gear train being shifted by said movable part into and out of operative position, and a shaft for said shiftable gear wheel provided with a hand-operating device for said gear train, substantially as set forth.

6. In a lathe or the like, the combination of a tool carriage, a driven feed shaft, a feed device for operatively connecting the carriage with said feed shaft to feed the tool, a gear train for feeding the carriage longitudinally, a pivoted gear carrier operated by said feed device, one of the gear wheels of said gear train being mounted on said gear carrier and shifted thereby into and out of operative position, and a shaft for said shiftable gear wheel provided with a hand crank for said gear train, substantially as set forth.

Witness my hand, this 14th day of August, 1906.

WILLIAM RUNGE.

Witnesses:
P. B. KENDIG,
A. S. DAVIS.